United States Patent [19]

Fukushima et al.

[11] 4,307,326
[45] Dec. 22, 1981

[54] DRIVE SYSTEM FOR A MOTOR

[75] Inventors: Isao Fukushima; Yoshinori Okada; Hideo Nishijima, all of Katsuta, Japan

[73] Assignee: Hitachi, Ltd., Tokyo, Japan

[21] Appl. No.: 149,535

[22] Filed: May 13, 1980

[30] Foreign Application Priority Data

May 14, 1979 [JP] Japan .................................. 54-58146

[51] Int. Cl.³ .............................................. H02P 7/28
[52] U.S. Cl. .................................. 318/411; 318/139; 318/342; 318/500
[58] Field of Search ............... 318/342, 343, 344, 500, 318/410, 411, 412, 413, 332, 442, 345 A, 434, 139, 341; 361/31; 323/22 T; 307/72, 73

[56] References Cited

U.S. PATENT DOCUMENTS

| 3,383,578 | 5/1968 | Lewis .............................. 318/326 |
| 3,641,422 | 2/1972 | Farnsworth et al. ............. 323/22 T |
| 3,662,245 | 5/1972 | Newell ............................. 318/442 |
| 3,753,138 | 8/1973 | Svendsen ......................... 318/331 |
| 3,757,193 | 9/1973 | Inaba et al. ..................... 318/685 |
| 3,873,901 | 3/1975 | Berry et al. ..................... 318/332 |
| 4,182,979 | 1/1980 | Douglas et al. .................. 318/434 |

Primary Examiner—David Smith, Jr.
Attorney, Agent, or Firm—Craig and Antonelli

[57] ABSTRACT

Disclosed is a drive system for a motor, wherein a current proportional to a change of a load of a motor is sensed by a sensing resistor. A voltage produced across the sensing resistor controls an electronic switch in a manner that the output DC voltage of a DC - DC converter is used for a motor drive power source at a normal load and yet a DC power source with a higher voltage than the output DC voltage of the DC - DC converter is used therefor at an increased load.

3 Claims, 5 Drawing Figures

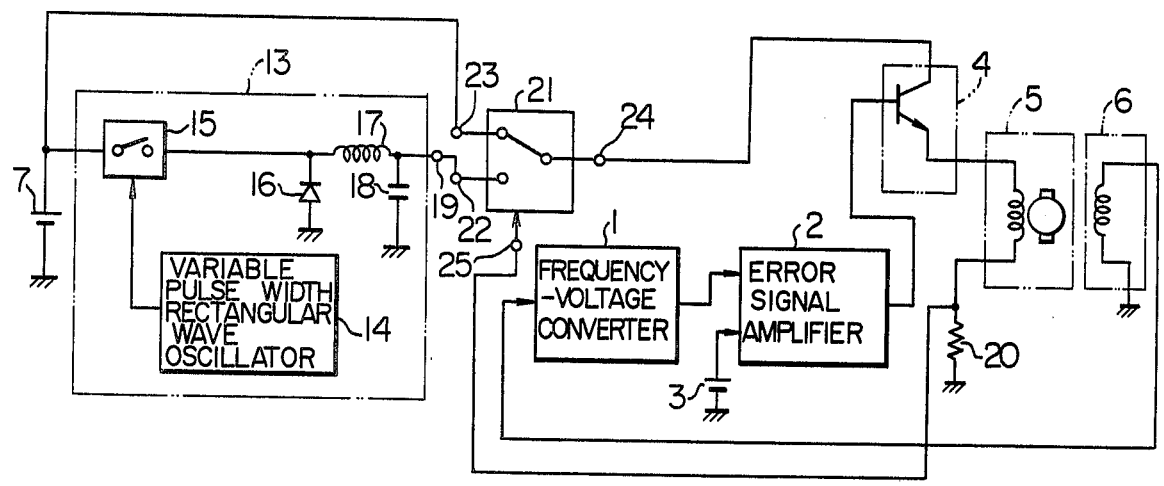
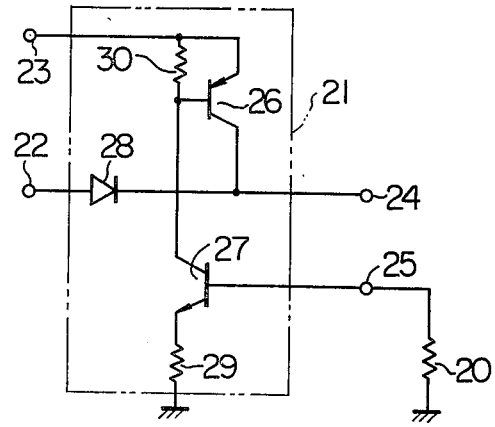
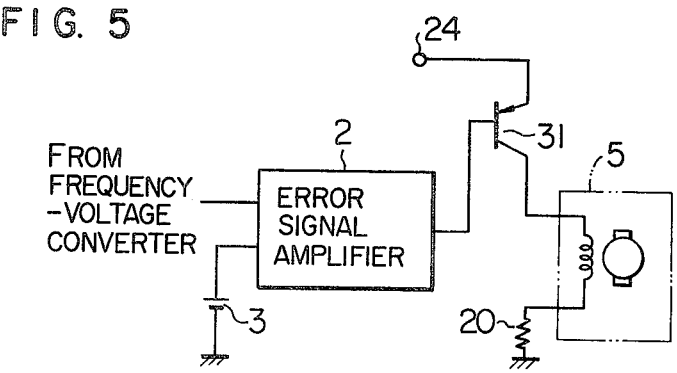

DRIVE SYSTEM FOR A MOTOR

BACKGROUND OF THE INVENTION

The invention relates to a drive system for a motor of which the speed is controlled.

FIG. 1 is a conventional motor drive system for controlling the motor speed. In the figure, reference numeral 1 designates a frequency-voltage converter; 2 an error signal amplifier; 3 a reference power source; 4 an emitter follower transistor for current amplification; 5 a motor; 6 a motor speed sensor for the motor. In operation, the motor speed of the motor 5 is detected by the motor speed sensor 6 which applies a signal with a frequency proportional to the motor speed to the frequency-voltage converter 1. The output signal from the frequency-voltage converter 1 is compared with the voltage Vr of a reference power source 3 such as a D.C. power source by the error signal amplifier 2 and the error signal amplifier 2 produces a DC voltage proportional to a signal representing difference therebetween. The DC voltage is applied to the emitter follower transistor 4 of which the output is applied to the motor 5. The number of revolutions of the motor is converted into a DC voltage by the frequency-voltage converter 1 and the DC voltage converted is constantly compared with the voltage Vr of the reference power source 3, so that it operates so as to make the difference voltage smaller and thus the motor speed is made constant. More specifically, when the load of the motor increases and the number of the rotations of the motor reduces, the frequency of the output signal from the motor speed sensor 6 also reduces, and the output signal from the frequency-voltage converter 1 has a large difference from the voltage Vr of the reference power source 3, so that the output signal from the error difference signal amplifier 2 increases. As a result, the output voltage of the emitter follower transistor 4 increases to increase the number of the revolutions of the motor, whereby the motor speed is kept constant.

With such a construction, a voltage applied to the motor at the stationary torque may be small, but it is necessary to increase the application voltage to the motor with the increase of the load torque of the motor. Therefore, it is necessary to increase a voltage drop across the emitter follower transistor 4 at the normal load by a voltage corresponding to the increasing motor voltage applied at the increase of the load. This increased voltage drop is consumed as a power loss. The increase of the load torque of the motor takes place not only at the start of the motor but also due to scar or water drop on a video tape in the case of a video tape recorder. In order to keep the motor speed constant against this frequent load variation, a good ability of the motor speed control must be secured and a start time of the motor must be reduced, so that high power source voltage is required and, at a normal load condition, the pregiven voltage is consumed by the emitter follower transistor 4 to drive the motor at a low voltage.

The explanation will be given about the characteristics between a load torque $\tau$ and N (hereinafter referred to $\tau$-N characteristic) of a general DC motor. The $\tau$-N characteristic of the general DC motor is illustrated in FIG. 2 with a parameter of the application voltage Vcc. As indicated by lines 8 to 11 in FIG. 2, the motor speed proportionally reduces with increase of the load. Therefore, the motor application voltage must be increased with the increase of the load so that the motor speed is not reduced even if the load is increased. Specifically, in order to obtain the motor speed No at no load ($\tau_0=0$), the motor application voltage may be Vcco. In order to keep the motor speed No constant regardless of increase of the load torque to $\tau_1$, however, it is necessary to increase the output voltage from the emitter follower transistor 4 and to increase the motor application voltage to Vcc1. Further, as the load torque increases to $\tau_2$ and $\tau_3$, the application voltage must be increased to Vcc2 and Vcc3 respectively. If the motor application voltage Vcc3 is the voltage of the power source 7, the motor application voltage is not increased beyond it, so that the circuit can not control the motor speed at constant against the load torque larger than $\tau_3$ and thus the motor speed is reduced. Therefore, a sufficient voltage must be needed in order to stably keep the motor speed against such a load variation.

Accordingly, a voltage obtained by subtracting a motor voltage applied at the stationary load from the motor application voltage Vcc, is applied to a transistor 4, so that there occurs a problem that a power loss corresponding to the product of the difference voltage and the current caused by the voltage is always produced.

SUMMARY OF THE INVENTION

Accordingly, an object of the invention is to provide a motor drive apparatus with a small power consumption.

A feature of the present invention resides in that at a low load, a high efficiency power source such as a DC-DC converter is used as a motor drive power source, while at an increased load the power source is switched to a high voltage source, whereby a power saving is secured with respect to the drive control of a motor.

BRIEF DESCRIPTION OF THE DRAWINGS

FIG. 3 is a block diagram illustrating the typical embodiment of the present invention.

FIG. 4 is a circuit diagram of an electronic switch which is well adapted for the motor drive apparatus according to the invention.

FIG. 5 is a circuit diagram of essential part of another embodiment of the present invention.

DESCRIPTION OF THE PREFERRED EMBODIMENTS

Figure 1:
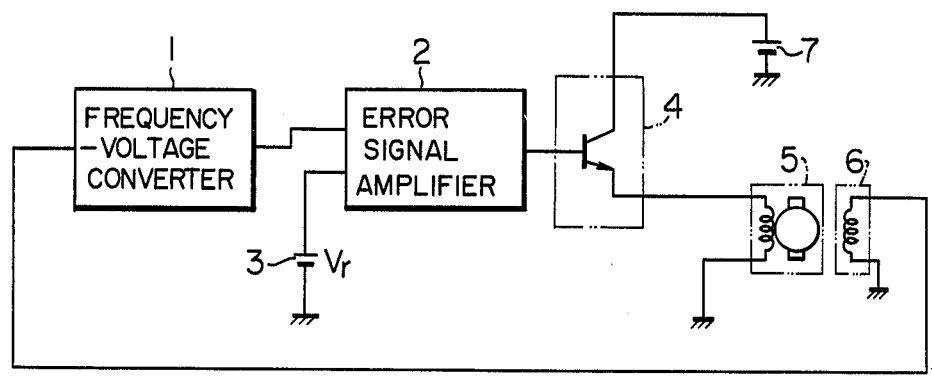
FIG. 1 is a circuit diagram of a conventional motor drive circuit with the controlled motor speed.
Figure 2:
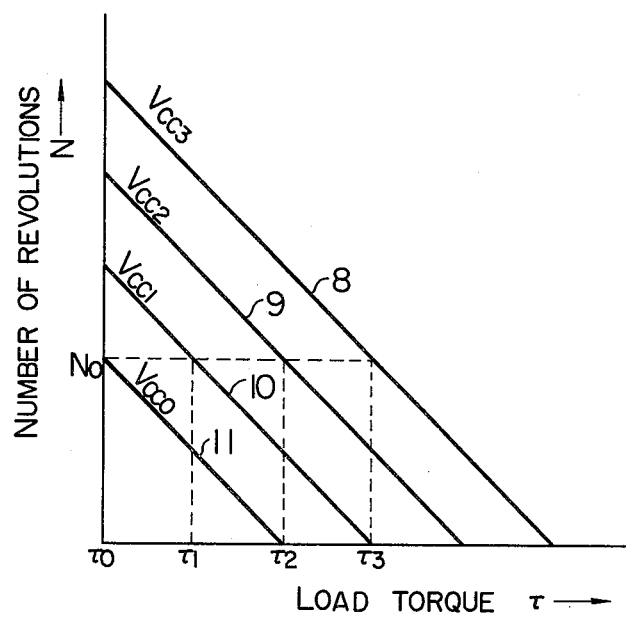
FIG. 2 is a graph representing a load torque-motor speed characteristic of a general motor.

Referring now to FIG. 3, there is shown a block diagram useful in explaining the principle of a drive system for a motor according to the present invention. In the figure, like symbols are used to designate like portions or parts in FIG. 1. In FIG. 3, reference numeral 13 designates a DC-DC converter comprising an oscillator 14 for generating a rectangular pulse signal with a variable pulse width, a switch 15, a diode 16, a coil 17, and a capacitor 18. As well known, the DC-DC converter 13 supplies power from the power source 7 to a load side when a switch 15 is conductive and stores part of the power in the coil 17. When the switch 15 is nonconductive, it supplies the power stored in the coil 17 to the load side. The capacitor 18, together with the coil 17, forms a low pass filter. The diode 16 provides a current path for the current flowing through the coil 17 and fed to the load when the switch 15 is nonconductive. In this example, the DC power source 7 provides 9 V and 6 V is taken out to the output terminal 19 of the DC-DC converter 13 by controlling the switch 15 through the oscillator 14. Thus, the consumed power by the DC-DC converter 13 is only the power consumed by the conduction resistor of the switch 15. Therefore, it may be used as an extremely high efficient voltage source and its efficiency is normally within a range of about 85% to 90%. In FIG. 3, reference numeral 20 designates a current sensing resistor connected in series with the motor 5 for sensing a current proportional to the increase or decrease of the load of the motor 5. Reference numeral 21 is an electronic switch having a first input terminal 22 connected to the output terminal 19 of the DC-DC converter 13, a second input terminal 23 connected to the DC power source 7, a control terminal 25 connected to the junction point of the motor coil and the resistor 20, and an output terminal 24 connected to the collector of the emitter follower transistor. A voltage produced across the resistor 20 drives the switch 21 in such a way that it is turned to the output terminal 19 of the high efficiency DC-DC converter 13 at the normal load, while is turned to the terminal 23 connected to the power source 7 at the increased load. At the terminal 19, a voltage of 6 V which is converted by the high efficiency DC-DC converter 13 with little loss, appears which is lower than the voltage of 9 V from the power source 7. With such a construction, at the normal load where the load of the motor 5 is small, a voltage produced across the resistor 20 is small. Accordingly, the low voltage of 6 V converted with a high efficiency by the DC-DC converter 13 is applied to the emitter follower transistor 4 through the switch 21. As a result, the motor 5 is driven with small loss at the emitter follower transistor 4. When the load varies at the start of the motor or upon the disturbances such as scars on the video tape, the output from the error signal amplifier 2 increases so as to increase the current flowing into the motor coil, so that a greater voltage is produced across the resistor 20. Since this voltage switches the contact of the switch 21 from the terminal 22 to the power source 7, a greater voltage is applied to the motor 5 without saturating the emitter follower transistor 4 by the increased output of the error signal amplifier 2. Consequently, the motor 5 can be controlled to have a constant motor speed. At this time, since a greater voltage is applied to the motor 5, the collector-emitter voltage of the emitter follower transistor 4 is small, so that the power loss of the transistor 4 is also small when compared at the normal load.

FIG. 4 illustrates a detailed embodiment of the switch 21 which is constructed by semiconductor devices. In FIG. 4, reference numeral 28 designates a Schottky diode; 26 a PNP transistor; 27 an NPN transistor; 29 and 30 resistors. The diode 28 is connected at the anode to the first input terminal 22 and at the cathode to the output terminal 24. The transistor 26 is connected at the emitter to the second input terminal 23, at the base to the emitter through a resistor 30, and at the collector to the output terminal 24. The transistor 27 is connected at the emitter to ground through a resistor 29, at the base to the control terminal 25 and at the connector to the base of the transistor 26. In the circuitry, the resistors 20, 29 and 30 are selected so that the voltage produced across the resistor 20 at the normal load state is not sufficient to turn on the transistor 26. In the cut off state of the transistor 26, the output voltage from the DC-DC converter 13 appearing at the terminal 22 is applied to the terminal 24 through the diode 28. This voltage is applied as the collector voltage of the emitter follower transistor 4 at the next stage. If the load increases and the voltage across the resistor 20 increases, the transistors 26 and 27 start to be conductive and the collector-emitter voltage of the transistor 26 becomes small. When the collector voltage of the transistor 26 exceeds a voltage which is obtained by subtracting a forward voltage of the diode 28 from the output voltage of the DC-DC converter applied to the terminal 22, the diode 28 automatically becomes non-conductive, with the result that the current applied from the DC power source 7 to the second input terminal 23 through the transistor 26, is fed to the output terminal 24 in place of the output voltage of the DC-DC converter.

In FIGS. 3 and 4, the power source applied to the terminal 23 is not limited to the power source 7 for the DC-DC converter 13, but may be other suitable power source if it is higher than the output power source voltage of the DC-DC converter 13.

Although the above-mentioned embodiment employs a constant voltage drive circuit using the emitter follower, a constant current drive circuit as shown in FIG. 5 is applicable for the motor drive circuit of the invention therefor. In this case, a PNP transistor 31 is used in place of the NPN transistor 4 in FIG. 3. All a designer has to do is to operate the error signal amplifier 2 to increase the output current of a PNP transistor 31 with the increase of the load.

As described above, according to the invention, at the normal load, the output of the DC-DC converter as a high efficiency power source is applied to the motor drive circuit, while at the increased load, it is switched to another power source. In this way, a power saved drive circuit for the motor is realized.

We claim:
1. A drive system for a motor comprising:
 a DC-DC converter;
 a drive circuit for driving the motor by a DC voltage outputted from said DC-DC converter;
 a sensing element for sensing a signal proportional to the current flowing through said motor;
 a DC power source with a higher voltage than the output DC voltage of said DC-DC converter; and
 an electronic switch which switches the power source directed to said drive circuit from said DC-DC converter to said DC power source, when a voltage appearing across said sensing element increases, including a first input terminal connected to the output of said DC-DC converter, a second input terminal connected to said DC power source, a control terminal connected to said sensing element, and an output terminal connected to said drive circuit, and which leads an output DC voltage of said DC-DC converter appearing at said first input terminal to said output terminal when a voltage appearing at said control terminal is low, and yet leads said DC power source appearing at said second input terminal to said output terminal when the voltage appearing at said control terminal increases.

2. A drive system for a motor according to claim 1, wherein said electronic switch is comprised of a diode connected at the anode to said first input terminal and at the cathode to said output terminal, a first transistor which is connected to said second input terminal and said output terminal and is cut off at the normal load, and a second transistor which is connected between said first transistor and said control terminal and conducts when the voltage appearing at said control terminal increases thereby to render said first transistor conductive and to shut off said diode.

3. A drive system for a motor according to claim 2, wherein said first and second transistors are opposite in the conductivity type, and wherein said first transistor is connected at the emitter to said second input terminal, at the base to said emitter through a first resistor, and at the collector to said output terminal, and said second transistor is connected at the emitter to a reference potential through a second resistor, at the base to said control terminal and at the collector to the base of said first transistor.

* * * * *